United States Patent [19]

Cherukuri et al.

[11] Patent Number: 5,266,335
[45] Date of Patent: Nov. 30, 1993

[54] MICROENCAPSULATED FLAVORING AGENTS AND METHODS FOR PREPARING SAME

[75] Inventors: Subraman R. Cherukuri, Towaco; Krishna P. Raman, Randolph, both of N.J.; Gul Mansukhani, Staten Island, N.Y.

[73] Assignee: Warner-Lambert Company, Morris Plains, N.J.

[21] Appl. No.: 942,097

[22] Filed: Sep. 8, 1992

Related U.S. Application Data

[63] Continuation of Ser. No. 519,052, May 4, 1990, abandoned.

[51] Int. Cl.$^5$ .............................................. A23G 3/30
[52] U.S. Cl. .................................... 426/3; 426/96; 426/302; 426/650; 426/651; 426/660
[58] Field of Search .................. 426/302, 534, 3, 5, 426/96, 650, 651, 660; 424/48; 264/4.3; 428/402.02

[56] References Cited

U.S. PATENT DOCUMENTS

| | | | |
|---|---|---|---|
| 3,687,865 | 8/1972 | Katayama et al. | 264/4.3 |
| 3,855,146 | 12/1974 | Saeki et al. | 264/4.3 |
| 3,897,361 | 7/1975 | Saeki et al. | 264/4.3 |
| 3,956,172 | 5/1976 | Saeki et al. | 264/4.3 |
| 4,253,877 | 3/1981 | Miale et al. | 264/4.3 |
| 4,376,113 | 3/1983 | Suglia et al. | 264/4.3 |
| 4,386,106 | 5/1983 | Merritt et al. | 264/4.3 |
| 4,983,404 | 1/1991 | Raman et al. | 426/3 |

*Primary Examiner*—R. B. Penland
*Attorney, Agent, or Firm*—Craig M. Bell

[57] ABSTRACT

The present invention pertains to a microencapsulated flavoring agent in the form of a spheroidal microcapsule which comprises a core and a coating layer over the core, wherein the microcapsule comprises (A) a core present in an amount up to about 90%, by weight of the microcapsule, which comprises (a) a flavoring agent in an amount from about 20% to about 80%, by weight of the core, and (b) a resin in an amount from about 80% to about 20%, by weight of the core, and (B) a coating layer over the core which comprises in percentages by weight of the coating layer, (a) gelatin in an amount from about 45% to about 49%, (b) gum arabic in an amount from about 45% to about 49%, and (c) glutaraldehyde in an amount from about 2% to about 10%. The encapsulated flavoring agents may be used in a wide variety of ingestible compositions and chewing gum products. The present invention also pertains to methods for preparing the encapsulated flavoring agents and the ingestible compositions in which they may be employed.

23 Claims, 1 Drawing Sheet

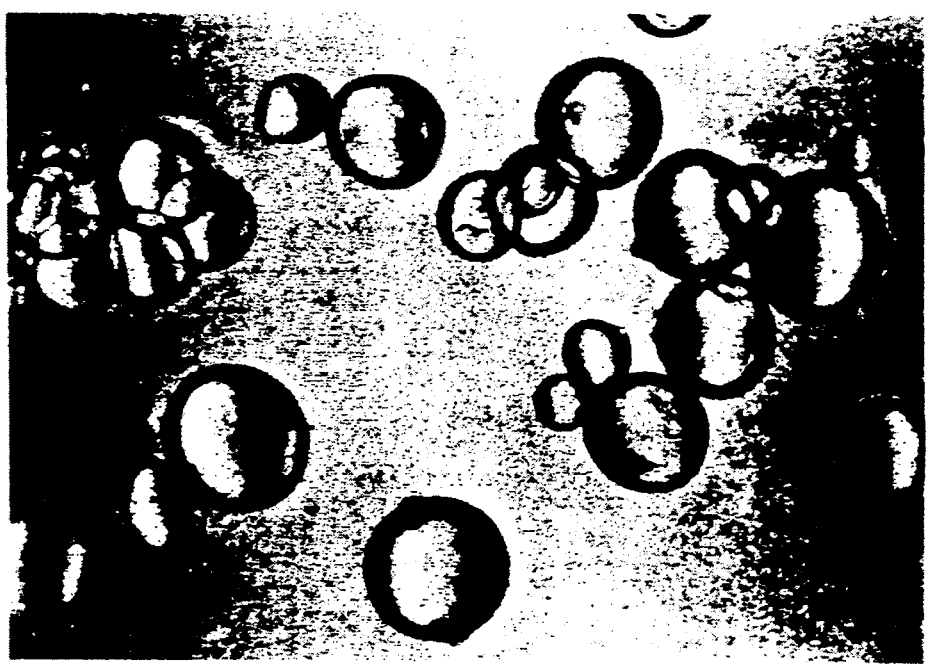

MICROENCAPSULATED FLAVORING AGENTS AND METHODS FOR PREPARING SAME

RELATED APPLICATIONS

This application is a continuation of U.S. Ser. No. 07/519,052 filed on May 4, 1990, now abandoned.

BACKGROUND OF THE INVENTION

1. Field of the Invention

This invention pertains to microencapsulated flavoring agents prepared by complex coacervation. More particularly, this invention pertains to microcapsules containing a core comprising an emulsion of a flavoring agent and a resin and a coating layer over the core comprising a mixture of hydrocolloid materials. The microencapsulated flavoring agents may be utilized in a wide variety of edible compositions.

2. Description of the Prior Art

Microencapsulated flavoring agents are agents in the form of microcapsules which contain a core of flavoring agent and a coating layer over the core to control the release of the flavoring agent in a predetermined and predictable manner. In addition to providing sustained release flavor and uniform flavor intensity, microencapsulation of flavoring agents also provides protection for the flavoring agent from moisture, light, oxidizing agents, and other environmental factors.

Microencapsulation also permits the physical and chemical characteristics of a flavoring agent such as a flavor oil to be changed. For example, the hydrophobic properties of flavor oils cause the oils to irreversibly bind to gum base and certain confectionery bulking agents resulting in loss of flavor intensity and nonuniform mixtures. Conversion of such flavor oils to flavor powders by encapsulation can prevent such binding.

U.S. Pat. No. 4,597,959, issued to Barr, discloses a method for releasing flavor material in a breath freshener which comprises forming a wafer of microencapsulated droplets in an adhesive carrier. The microencapsulated droplets comprise liquid flavoring material in an amount from 85% to 90% and an encapsulating material of cross-linked gelatin and gum arabic in an amount of 5% to 15%, by weight.

U.S. Pat. No. 4,568,560, issued to Schoebel and assigned to Warner-Lambert Company, discloses a method for preparing a controlled release encapsulated active agent which comprises spray coating the active agent with a coating composition comprising a water-insoluble film-forming agent, an enteric agent, and a plasticizing agent.

U.S. Pat. No. 3,949,096, issued to Johnson et al. and assigned to SCM Corporation, discloses an improvement in a process for spray drying encapsulated particles which comprises cooling the spray dried particles while suspended in a stream of gas to prevent agglomeration. The coating materials in the process may be a saccharide material, proteinaceous material, edible gums and starches, edible waxes, edible resins, and normally solid lipoidal material.

U.S. Pat. Nos. 2,809,895 and 3,041,180, both issued to Swisher and assigned to Sunkist Growers, Inc., disclose a process for preparing an essential oil solid emulsion which comprises heating and melting a corn syrup solids solution, then adding to the melt a dispersing agent, and an essential oil containing an oil antioxidant, and then emulsifying and drying the resulting composition.

U.S. Pat. No. 4,610,890, issued to Miller et al. and assigned to Sunkist Growers, Inc., discloses a process for preparing an extruded essential oil solid emulsion which comprises heating an aqueous mixture of a sugar, a starch hydrolysate and an emulsifier, then admixing an essential oil to the aqueous mixture, and extruding the homogeneous melt into a cool solvent.

U.S. Pat. No. 3,949,096, issued to Barnes et al. and assigned to SCM Corporation, discloses a particulate composition comprising a matrix composition with up to about 40% loading wherein the matrix comprises from about 5 parts to about 95 parts maltodextrin and from about 95 parts to about 5 parts of hydrogen octenyl butanedioate amylodextrin.

U.S. Pat. No. 3,949,096, issued to Johnson et al. and assigned to SCM Corporation, discloses a composition comprising a coconut core coated with a mixture of sugar particles and sugar particles encapsulated in edible fat.

U.S. Pat. No. 3,949,096, issued to Koene et al. and assigned to Naarden International N.V., discloses a process for flavoring dry vegetable matter which comprises mixing the vegetable material with a microencapsulated flavoring agent and an adhesive solution. The microencapsulated flavoring agent consists of droplets of flavor oils coated by an envelope of edible hydrocolloids.

U.S. Pat. No. 3,704,137, issued to Beck, discloses a process for preparing a particulate flavor oil which comprises mixing and heating an aqueous mixture of sucrose, hydrolyzed cereal solids and an emulsifier, then admixing an essential oil, and extruding and cooling the melt.

United Kingdom patent application no. 2,204,553A, to National Research Development Corporation, discloses microcapsules prepared by coacervation wherein the coating material comprises gelatin and polysaccharide XM6 obtained from bacteria.

Thus, a variety of encapsulated flavoring agents are known which have specific flavoring intensities and properties. There is still a need, however, for flavoring compositions which have varying properties, enhanced flavoring intensities and delayed sustained release properties for use in ingestible compositions. Such encapsulated flavoring agents would control flavor release and would permit an ingestible composition to contain a reduced total amount of flavoring composition and thereby reduce costs, and stability problems. The present invention provides such encapsulated flavoring agents and the ingestible compositions and chewing gum products in which the encapsulated flavoring agents may be used.

SUMMARY OF THE INVENTION

The present invention pertains to a microencapsulated flavoring agent in the form of a spheroidal microcapsule which comprises a core and a coating layer over the core, wherein the microcapsule comprises (A) a core present in an amount up to about 90%, by weight of the microcapsule, which comprises (a) a flavoring agent in an amount from about 20% to about 80%, by weight of the core, and (b) a resin in an amount from about 80% to about 20%, by weight of the core, and (B) a coating layer over the core which comprises in percentages by weight of the coating layer, (a) gelatin in an amount from about 45% to about 49%, (b) gum arabic in an amount from about 45% to about 49%, and (c) glutaraldehyde in an amount from about 2% to about 10%. The encapsulated flavoring agents may be used in a wide variety of ingestible compositions and chewing gum products. The present invention also pertains to methods for preparing the encapsulated flavoring agents and the ingestible compositions in which they may be employed.

BRIEF DESCRIPTION OF THE DRAWING

FIG. 1 is a picture of microencapsulated flavoring agents in the form of spheroidal microcapsules which comprise a core of peppermint oil and the glycerol ester of partially hydrogenated wood rosin and a coating layer over the core comprising a mixture of gelatin and gum arabic (magnification 125X).

DETAILED DESCRIPTION OF THE INVENTION

The present invention pertains to a microencapsulated flavoring agent which comprises a microcapsule containing a core present in an amount up to about 90%, by weight of the microcapsule, and a coating layer over the core, wherein the microcapsule comprises (A) a core which comprises in percentages by weight of the core, (a) a flavoring agent in an amount from about 20% to about 80%; and (b) a resin in an amount from about 80% to about 20%, and (B) a coating layer over the core which comprises in percentages by weight of the coating layer, (a) gelatin in an amount from about 45% to about 49%, (b) gum arabic in an amount from about 45% to about 49%, and (c) glutaraldehyde in an amount from about 2% to about 10%.

Applicants have discovered that by encapsulating a core comprising an emulsion of a flavoring agent and a resin with a coating layer prepared by complex coacervation of a mixture of two or more colloidal materials, an encapsulated flavoring agent containing up to about 90% core can be prepared which has improved delayed sustained release properties. The emulsion of flavoring oil and resin in the core protects and masks the flavoring agent and provides sustained release properties. By encapsulating the flavor oil and resin emulsion in a mixture of hydrophilic colloidal materials, applicants have found that the flavoring agents are easier to incorporate into edible products, have improved storage properties, and have enhanced delayed sustained release properties.

Applicants define the terms "ingestible" and "edible" to include all materials and compositions which are used by or which perform a function in the body. Materials and compositions which are adsorbed and those which are not absorbed as well as those which are digestible and non-digestible are included.

As set out above, the microencapsulated flavoring agents of the present invention are microcapsules which contain a core comprising (a) a flavoring agent, and (b) a resin. The core is preferably present in the microcapsule in an amount up to about 90%, more preferably in an amount up to about 85%, and most preferably in an amount up to about 80%, by weight of the microcapsule. In a preferred embodiment, the flavoring agent is present in an amount from about 20% to about 80%, preferably from about 35% to about 65%, and more preferably from about 50% to about 50%, by weight of the total core. The resin comprises the remaining material in the core.

Preferably, the coating layer over the core comprises, in percentages by weight of the coating layer, gelatin in an amount from about 45% to about 49%, more preferably from about 46% to about 49%, and most preferably from about 47% to about 48%. Preferably, the coating layer over the core also comprises, in percentages by weight of the coating layer, gum arabic in an amount from about 45% to about 49%, more preferably from about 46% to about 49%, and most preferably from about 47% to about 48%. Preferably, the coating layer over the core further comprises, in percentages by weight of the coating layer, glutaraldehyde in an amount from about 2% to about 10%, more preferably from about 2% to about 8%, and most preferably from about 2% to about 6%.

The flavoring agents which may be used include those flavors known to the skilled artisan, such as natural and artificial flavors. These flavorings may be chosen from synthetic flavor oils and flavoring aromatics and/or oils, oleoresins and extracts derived from plants, leaves, flowers, fruits, and so forth, and combinations thereof. Nonlimiting representative flavor oils include spearmint oil, cinnamon oil, oil of wintergreen (methyl salicylate), peppermint oil, clove oil, bay oil, anise oil, eucalyptus oil, thyme oil, cedar leaf oil, oil of nutmeg, allspice, oil of sage, mace, oil of bitter almonds, and cassia oil. Also useful flavorings are artificial, natural and synthetic fruit flavors such as vanilla, and citrus oils including lemon, orange, lime, grapefruit, and fruit essences including apple, pear, peach, grape, strawberry, raspberry, cherry, plum, pineapple, apricot and so forth. These flavoring agents may be used in liquid or solid form and may be used individually or in admixture. Commonly used flavors include mints such as peppermint, menthol, artificial vanilla, cinnamon derivatives, and various fruit flavors, whether employed individually or in admixture.

Other useful flavorings include aldehydes and esters such as cinnamyl acetate, cinnamaldehyde, citral diethylacetal, dihydrocarvyl acetate, eugenyl formate, p-methylamisol, and so forth may be used. Generally any flavoring or food additive such as those described in *Chemicals Used in Food Processing*, publication 1274, pages 63–258, by the National Academy of Sciences, may be used.

Further examples of aldehyde flavorings include but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinnamaldehyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimethyl-5-heptenal, i.e., melonal (melon), 2,6-dimethyloctanal (green fruit), and 2-dodecenal (citrus, mandarin), cherry, grape, strawberry shortcake, mixtures thereof and the like.

In a preferred embodiment, the flavoring agent is selected from the group consisting of peppermint oil, cinnamon oil, spearmint oil, fruit flavor oil, and mixtures thereof.

The term "resins" as used herein refers to resins such as wood rosins, rosin esters and ester gums. Suitable resins may be selected from the group consisting of the pentaerythritol ester of partially hydrogenated wood rosin, the pentaerythritol ester of wood rosin, the glycerol ester of wood rosin, the glycerol ester of partially dimerized rosin, the glycerol ester of polymerized rosin, the glycerol ester of tall oil rosin, the glycerol ester of wood rosin and partially hydrogenated wood or gum rosin and the partially hydrogenated methyl ester of rosin, such as polymers of alpha-pinene, beta-pinene, terpene resins including polyterpene, and mixtures thereof. In a preferred embodiment, the resin is the glycerol ester of partially hydrogenated wood or gum rosin.

The resin components useful in the present invention are selected because of their compatible temperature characteristics. Thus, the glycerol ester of partially hydrogenated wood or gum rosin, manufactured by Hercules Chemical and identified as Resin Ester #5, has a softening point ranging from about 79° C. to about 88° C. Similarly, the glycerol ester of tall oil rosin has a softening point from about 80° C. to about 88° C., the glycerol ester of wood rosin has a softening point from about 88° C. to about 96° C., and the methyl ester of partially hydrogenated wood rosin is liquid at room temperature. Certain of the polyterpenes comprising the terpene hydrocarbon resins have softening points that vary with the type of resin and generally range from about 100° C. to about 125° C. Similarly, the pentaerythritol ester of partially hydrogenated wood rosin has a softening point of from about 102° C. to about 110° C., the pentaerythritol ester of wood rosin has a softening point ranging from about 109° C. to about 116° C., the glycerol ester of polymerized rosin has a softening point ranging from about 80° C. to about 126° C., and the glycerol ester of partially dimerized rosin has a softening point ranging from about 80° C. to about 125° C.

In general, the core may be prepared by heating and melting the resin component and admixing the flavoring agent to the resin melt to form a homogeneous mixture. Preferably, the core is prepared by heating the resin component to its melting point which, in most instances, ranges from about 85° C. to about 90° C., after which the resulting melt is cooled to a temperature of less than about 85° C. to minimize vaporization during addition of the flavoring agent. Thereafter, the resin is permitted to slowly cool while the flavoring agent or oil is added with mixing. Upon completion of addition of the flavoring agent, the resulting blend is continually stirred until it cools to approximately room temperature. The resulting blend may then be recovered and will be found to be generally liquid or semi-liquid in state and clear or amber in color depending upon the amount of resin present, and the melting points of the resin and flavoring agents.

Optionally, an emulsifying agent may be added to the resin melt to form a core emulsion. In a preferred embodiment, the emulsifying agent may be present in am amount up to about 10%, by weight. Emulsifying agent is added to the resin melt prior to the addition of the flavoring agent so that the emulsifying agent and resin are mixed and melted together. When emulsifying agents are employed, suitable emulsifying agents include monoglyceride, diglyceride and triglyceride esters of fatty acids, polyglycerol esters, and the like, and mixtures thereof. More particularly, the emulsifying agent may be selected from the group consisting of lecithin, stearates, stearate esters, palmitates, palmitate esters, oleates, oleate esters, glycerides, sucrose polyesters, polyglycerolesters, and mixtures thereof.

In a particularly preferred embodiment, the core of the present invention comprises a flavoring agent and a resin present in equal amounts of 45% with the emulsifying agent being present in an amount of 10%, by weight of the core. An artificial sweetening agent may also be optionally added. Artificial sweetening agent is added either simultaneously with, or subsequent to, the addition of the flavoring agent to the resin melt.

Cores containing flavor oils and resin components are described in more detail in commonly assigned U.S. patent application Ser. No. 361,529, filed Jun. 5, 1989, which disclosure is incorporated herein by reference.

As set out above, the microencapsulated flavoring agent comprises a coating layer over the core. The coating layer is prepared by complex coacervation of a mixture of two or more colloidal materials which must be hydrophilic, gelable, and ionizable. Coacervation is the aggregation of colloidal spheres held together by electrostatic forces. In complex coacervation, the aggregation of colloidal spheres is a mixture of two or more oppositely charged hydrophilic colloidal materials (a cationic colloidal material and an anionic colloidal material). The colloidal material may be selected from the group consisting of natural and synthetic colloidal materials such as gelatin, albumen, alginates, casein, agar-agar, starch, pectins, gum arabic, carboxymethyl cellulose, polyacrylic acid, polacrylamide, and the like, and mixtures thereof. In a preferred embodiment, the colloidal materials in the coating layer comprise gelatin and gum arabic.

In general, the microencapsulated flavoring agents are prepared by forming an aqueous solution of the first hydrophilic colloidal material at a temperature above the gelation temperature of the first colloidal material. The flavoring agent and resin emulsion, prepared as set out above, is then admixed with the aqueous colloidal material to form an emulsion. The mixing speed of the emulsion is adjusted to form the desired particle size. An aqueous solution of the second hydrophilic colloidal material is the prepared at a temperature above the gelation temperature of the second colloidal material. The solution of second hydrophilic colloidal material is then admixed with the emulsion of flavoring agent and resin and first colloidal material. In general, the order of addition of colloidal materials is not critical. Coacervation, or aggregation to uniformly distribute the colloidal materials around the flavoring oil droplets, is then carried out by diluting the emulsion with water, adjusting the pH of the emulsion, or both.

The coacervation process is carried out at a temperature above the gelation temperature of the colloidal materials. After mixing and coacervation, the temperature of the emulsion is lowered to a temperature below the gelation temperature of the colloidal materials to cause gelation of microcapsules. The capsules may then be treated to increase the water-resistance of, or harden, the capsules such as by cross-linking the gelatin component of the capsules, preferably below room temperature, with an aqueous solution of formaldehyde or glutaraldehyde. In a preferred embodiment, the cross-linking agent is glutaraldehyde.

The size of the pores in the walls of the microcapsule may be controlled by the rate of the gelling process. A rapid gelling process usually results in pores having a small size. For example, when the emulsion is rapidly cooled and gelled, the resulting microcapsules will have a pore size so small that the encapsulated oil will not escape through the capsule walls.

In a preferred embodiment, the present invention is directed at a method for preparing a microencapsulated flavoring agent in the form of a spheroidal microcapsule which comprises a core and a coating layer over the core, which comprises the steps of:

(1) providing the following ingredients:

(A) a core present in an amount up to about 90%, by weight of the microcapsule, which comprises:

(a) a flavoring agent in an amount from about 20% to about 80%, by weight of the core; and (b) a resin in an amount from about 80% to about 20%, by weight of the core; and (B) a coating layer over the core which comprises in percentages by weight of the coating layer;

(a) gelatin in an amount from about 45% to about 49%;

(b) gum arabic in an amount from about 45% to about 49%; and (c) glutaraldehyde in an amount from about to about 10%;

(2) forming an aqueous solution of the gelatin at a temperature above the gelation temperature of the gelatin;

(3) melting the resin and admixing the flavoring agent to the melted resin;

(4) cooling the mixture of flavoring agent and resin and admixing the mixture to the aqueous gelatin to form an emulsion;

(5) forming an aqueous solution of the gum arabic at a temperature above the gelation temperature of the gum arabic;

(6) admixing the aqueous solution of gum arabic to the emulsion of step (4);

(7) diluting the emulsion with water and adjusting the pH of the emulsion to cause coacervation of microcapsules;

(8) lowering the temperature of the emulsion to below the gelation temperature of the gelatin and gum arabic to cause gelation of the microcapsules;

(9) treating the microcapsules with an aqueous solution of glutaraldehyde; and

(10) recovering the microcapsules.

Once prepared, the inventive microencapsulated flavoring agent may be stored for future use or may be formulated in effective amounts with conventional additives, such as pharmaceutically acceptable carriers or confectionery ingredients to prepare a wide variety of ingestible compositions, such as foodstuffs, beverages, jellies, extracts, hard and soft confectionery products, orally administered pharmaceutical compositions, and hygienic products such as toothpastes, dental lotions, mouth washes and chewing gums.

The amount of the inventive microencapsulated flavoring agent employed in an edible composition is an effective amount to flavor the edible composition. The exact amount of the microencapsulated flavoring agent employed is a matter of preference, subject to such factors as the type of bulking agent or carrier employed in the composition and the strength of flavor desired. Thus, the amount of flavoring composition may be varied in order to obtain the result desired in the final product and such variations are within the capabilities of those skilled in the art without the need for undue experimentation. In general, the amount of microencapsulated flavoring agent normally present in an edible composition will be from about 0.02% to about 5%, preferably from about 0.1% to about 2%, and more preferably from about 0.8% to about 1.2%, by weight of the edible composition.

The present invention extends to methods of making the ingestible compositions. In such a method, a composition is made by admixing an effective amount of the microencapsulated flavoring agent of the present invention with a pharmaceutically acceptable carrier or confectionery material and the other ingredients of the final desired ingestible composition. Other ingredients will usually be incorporated into the composition as dictated by the nature of the desired composition as well as by those having ordinary skill in the art. The ultimate ingestible compositions are readily prepared using methods generally known in the food technology and pharmaceutical arts.

In another embodiment, the present invention is directed at a method for flavoring an edible composition which comprises adding to the edible composition an effective amount of a microencapsulated flavoring agent in the form of a spheroidal microcapsule which comprises a core and a coating layer over the core, wherein the microcapsule comprises:

(A) a core present in an amount up to about 90%, by weight of the microcapsule, which comprises:

(a) a flavoring agent in an amount from about 20% to about 80%, by weight of the core; and (b) a resin in an amount from about 80% to about 20%, by weight of the core; and (B) a coating layer over the core which comprises in percentages by weight of the coating layer;

(a) gelatin in an amount from about 45% to about 49%;

(b) gum arabic in an amount from about 45% to about 49%; and (c) glutaraldehyde in an amount from about 2% to about 10%.

An important aspect of the present invention includes an improved chewing gum composition incorporating the inventive microencapsulated flavoring agent and a method for preparing the chewing gum composition, including both chewing gum and bubble gum formulations. In general, the improved chewing gum compositions will contain a gum base, an effective amount of the inventive microencapsulated flavoring agent, and various additives.

The chewing gum compositions may be reduced-calorie chewing gums employing high levels of a chewing gum base having an enhanced hydrophilic character. These reduced-calorie chewing gums will comprise a gum base present in an amount from about 50% to about 95%, preferably from about 50% to about 85%, and more preferably from about 60% to about 70%, by weight of the chewing gum composition. When a reduced-calorie product is not desired, the chewing gum composition may contain lower amounts of a chewing gum base. These chewing gums will comprise a gum base present in an amount up to about 55%, preferably from about 15% to about 40%, and more preferably from about 20% to about 35%, by weight of the chewing gum composition.

As used herein, the term "reduced-calorie composition" means a composition having a caloric value two thirds or less than that of a conventional composition. The term "tight" or "rubbery" chew refers to a chewing gum composition which requires a large amount of muscular chewing effort to masticate or to a composition which provides a gum bolus with high elasticity and bounce and which is difficult to deform.

Gum bases having an enhanced hydrophilic character include polyvinyl acetate gum bases which may also contain a low melting point wax. Such gum bases do not require a high level of bulking agent to plasticize the gum base and render it soft during chewing. These gum bases may be used at higher than normal levels in chewing gum compositions in place of a bulking and/or a bulk sweetening agent to prepare high base-low bulking agent reduced-calorie gums which do not have rubbery or tight chew characteristics. These gum bases possess increased hydrophilic properties over conventional gum bases and appear to increase in size during chewing releasing flavoring and sweetening agents which would normally be entrapped in the gum base while maintaining a soft chew texture. Reduced-calorie chewing gum compositions prepared with such gum bases in high levels are less hygroscopic (have lower moisture-pickup) and are less prone to becoming stale than conventional reduced-calorie gum compositions while having comparable firmness and texture.

The elastomers (rubbers) employed in the gum base of the present invention will vary greatly depending upon various factors such as the type of gum base desired, the consistency of gum composition desired and the other components used in the composition to make the final chewing gum product. The elastomer may be any water-insoluble polymer known in the art, and includes those gum polymers utilized for chewing gums and bubble gums. Illustrative examples of suitable polymers in gum bases include both natural and synthetic elastomers. For example, those polymers which are suitable in gum base compositions include, without limitation, natural substances (of vegetable origin) such as chicle, natural rubber, crown gum, nispero, rosidinha, jelutong, perillo, niger gutta, tunu, balata, guttapercha, lechi capsi, sorva, gutta kay, and the like, and mixtures thereof. Examples of synthetic elastomers include, without limitation, styrene-butadiene copolymers (SBR), polyisobutylene, isobutylene-isoprene copolymers, polyethylene, and the like, and mixtures thereof.

The amount of elastomer employed in the gum base will vary greatly depending upon various factors such as the type of gum base used, the consistency of the gum composition desired and the other components used in the composition to make the final chewing gum product. In general, the elastomer will be present in the gum base in an amount from about 0.5% to about 20%, and preferably from about 2.5% to about 15%, by weight of the gum base.

The polyvinyl acetate polymer employed in the gum base of the present invention is a polyvinyl acetate polymer having a medium molecular weight, specifically, having a mean average molecular weight in the range from about 35,000 to about 55,000. This medium molecular weight polyvinyl acetate polymer will preferably have a viscosity from about 35 seconds to about 5 seconds (ASTM designation D1200-82 using a Ford cup viscometer procedure). The medium molecular weight polyvinyl acetate polymer will be present in the gum base in an amount from about 10% to about 25%, and preferably from about 12% to about 27%, by weight of the gum base.

The medium molecular weight polyvinyl acetate polymer may also be blended with a low molecular weight polyvinyl acetate polymer. The low molecular weight polyvinyl acetate polymer will have a mean average molecular weight in the range from about 12,000 to about 16,000. This low molecular weight polyvinyl acetate polymer will preferably have a viscosity from about 14 seconds to about 16 seconds (ASTM designation D1200-82 using a Ford cup viscometer procedure). The low molecular weight polyvinyl acetate polymer will be present in the gum base in an amount up about 17%, and preferably from about 12% to about 17%, by weight of the gum base.

When a low molecular weight polyvinyl acetate polymer is blended with a medium molecular weight polyvinyl acetate polymer, the polymers will be present in a mole ratio from about 1:0.5 to about 1:1.5, respectively.

The medium molecular weight polyvinyl acetate polymer may also be blended with a high molecular weight polyvinyl acetate polymer. The high molecular weight polyvinyl acetate polymer will have a mean average molecular weight in the range from about 65,000 to about 95,000. The high molecular weight polyvinyl acetate polymer will be present in the gum base in an amount up to about 5%, by weight of the gum base.

The acetylated monoglycerides in the present invention, like the polyvinyl acetate polymer, serve as plasticizing agents. While the saponification value of the acetylated monoglycerides is not critical, preferable saponification values are 278 to 292, 316 to 331, 370 to 380, and 430 to 470. A particularly preferred acetylated monoglyceride has a saponification value above about 400. Such acetylated monoglycerides generally have an acetylation value (percentage acetylated) above about 90 and a hydroxyl value below about 10 (Food Chemical Codex (FCC) III/P508 and the revision of AOCS).

The use of acetylated monoglycerides in the present gum base is preferred over the use of bitter polyvinyl acetate (PVA) plasticizers, in particular, triacetin. The acetylated monoglycerides will be present in the gum base in an amount from about 4.5% to about 10%, and preferably from about 5% to about 9%, by weight of the gum base.

The wax in the gum base of the present invention softens the polymeric elastomer mixture and improves the elasticity of the gum base. The waxes employed will have a melting point below about 60° C., and preferably between about 45° C. and about 55° C. A preferred wax is low melting paraffin wax. The wax will be present in the gum base in an amount from about 6% to about 10%, and preferably from about 7% to about 9.5%, by weight of the gum base.

In addition to the low melting point waxes, waxes having a higher melting point may be used in the gum base in amounts up to about 5%, by weight of the gum base. Such high melting waxes include beeswax, vegetable wax, candelilla wax, carnauba wax, most petroleum waxes, and the like, and mixtures thereof.

In addition to the components set out above, the gum base includes a variety of traditional ingredients, such as a component selected from the group consisting of elastomer solvents, emulsifying agents, plasticizers, fillers, and mixtures thereof. These ingredients are present in the gum base in an amount to bring the total amount of gum base to 100%.

The gum base may contain elastomer solvents to aid in softening the elastomer component. Such elastomer solvents may comprise those elastomer solvents known in the art, for example, terpinene resins such as polymers of alpha-pinene or beta-pinene, methyl, glycerol and pentaerythritol esters of rosins and modified rosins and gums, such as hydrogenated, dimerized and polymerized rosins, and mixtures thereof. Examples of elastomer solvents suitable for use herein include the pentaerythritol ester of partially hydrogenated wood and gum rosin, the pentaerythritol ester of wood and gum rosin, the glycerol ester of wood rosin, the glycerol ester of partially dimerized wood and gum rosin, the glycerol ester of polymerized wood and gum rosin, the glycerol ester of tall oil rosin, the glycerol ester of wood and gum rosin and the partially hydrogenated wood and gum rosin and the partially hydrogenated methyl ester of wood and rosin, and the like, and mixtures thereof. The elastomer solvent may be employed in the gum base in amounts from about 2% to about 15%, and preferably from about 7% to about 11%, by weight of the gum base.

The gum base may also include emulsifying agents which aid in dispersing the immiscible components into a single stable system. The emulsifying agents useful in this invention include glyceryl monostearate, lecithin, fatty acid monoglycerides, diglycerides, propylene glycol monostearate, and the like, and mixtures thereof. A preferred emulsifying agent is glyceryl monostearate. The emulsifying agent may be employed in amounts from about 2% to about 15%, and preferably from about 7% to about 11%, by weight of the gum base.

The gum base may also include plasticizers or softeners to provide a variety of desirable textures and consistency properties. Because of the low molecular weight of these ingredients, the plasticizers and softeners are able to penetrate the fundamental structure of the gum base making it plastic and less viscous. Useful plasticizers and softeners include lanolin, palmitic acid, oleic acid, stearic acid, sodium stearate, potassium stearate, glyceryl triacetate, glyceryl lecithin, glyceryl monostearate, propylene glycol monostearate, acetylated monoglyceride, glycerine, and the like, and mixtures thereof. Waxes, for example, natural and synthetic waxes, hydrogenated vegetable oils, petroleum waxes such as polyurethane waxes, polyethylene waxes, paraffin waxes, microcrystalline waxes, fatty waxes, sorbitan monostearate, tallow, propylene glycol, mixtures thereof, and the like, may also be incorporated into the gum base. The plasticizers and softeners are generally employed in the gum base in amounts up to about 20%, and preferably in amounts from about 9% to about 17%, by weight of the gum base.

Preferred plasticizers are the hydrogenated vegetable oils and include soybean oil and cottonseed oil which may be employed alone or in combination. These plasticizers provide the gum base with good texture and soft chew characteristics. These plasticizers and softeners are generally employed in amounts from about 5% to about 14%, and preferably in amounts from about 5% to about 13.5%, by weight of the gum base.

In another preferred embodiment, the softening agent is anhydrous glycerin, such as the commercially available United States Pharmacopeia (USP) grade. Glycerin is a syrupy liquid with a sweet warm taste and has a sweetness of about 60% of that of cane sugar. Because glycerin is hygroscopic, it is important that the anhydrous glycerin be maintained under anhydrous conditions throughout the preparation of the chewing gum composition.

The gum base of this invention may also include effective amounts of bulking agents such as mineral adjuvants which may serve as fillers and textural agents. Useful mineral adjuvants include calcium carbonate, magnesium carbonate, alumina, aluminum hydroxide, aluminum silicate, talc, tricalcium phosphate, dicalcium phosphate, and the like, and mixtures thereof. These fillers or adjuvants may be used in the gum base compositions in various amounts. Preferably the amount of filler, when used, will be present in an amount from about 15% to about 40%, and preferably from about 20% to about 30%, by weight of the gum base.

A variety of traditional ingredients may be optionally included in the gum base in effective amounts such as coloring agents, antioxidants, preservatives, flavoring agents, and the like. For example, titanium dioxide and other dyes suitable for food, drug and cosmetic applications, known as F. D. & C. dyes, may be utilized. An anti-oxidant such as butylated hydroxytoluene (BHT), butylated hydroxyanisole (BHA), propyl gallate, and mixtures thereof, may also be included. Other conventional chewing gum additives known to one having ordinary skill in the chewing gum art may also be used in the gum base.

In one embodiment, the gum base is present in the chewing gum composition in an amount from about 40% to about 75%, by weight of the chewing gum composition and comprises (a) an elastomer present in an amount from about 0.5% to about 20%, by weight of the gum base, (b) a medium molecular weight polyvinyl acetate polymer having a molecular weight from about 35,000 to about 55,000 present in an amount from about 10% to about 25%, by weight of the gum base, (c) an acetylated monoglyceride present in an amount from about 4.5% to about 10%, by weight of the gum base, (d) a wax having a melting point below about 60° C. present in an amount from about 6% to about 10%, by weight of the gum base, and (e) a material selected from the group consisting of elastomer solvents, emulsifying agents, plasticizers, fillers, and mixtures thereof, present in an amount to bring the total amount of gum base to 100%, by weight of the gum base.

The manner in which the gum base components are admixed is not critical and is performed using standard techniques and apparatus known to those skilled in the art. In a typical method, an elastomer is admixed with an elastomer solvent and/or a plasticizer and/or an emulsifying agent and agitated for a period of from 1 to 30 minutes. After blending is complete, the polyvinyl acetate component is admixed into the mixture. The medium molecular weight polyvinyl acetate is preferably admixed prior to addition of the optional low molecular weight polyvinyl acetate to prevent the creation of pockets of polyvinyl acetate within the elastomer mixture. The remaining ingredients, such as the low melting point wax, are then admixed, either in bulk or incrementally, while the gum base mixture is blended again for 1 to 30 minutes.

Chewing gum compositions employing a high level of a soft polyvinyl acetate chewing gum base having an enhanced hydrophilic character are more fully described in U.S. Pat. No. 4,872,884, which disclosure is incorporated herein by reference.

Other gum bases having an enhanced hydrophilic nature and suitable for use in reduced-calorie chewing gum compositions in high levels may also be employed in the present invention. In general, these gum bases may be employed in amounts up to 99%, preferably from about 40% to about 85%, and more preferably from about 40% to about 75%, by weight of the chewing gum composition. Suitable gum bases having an enhanced hydrophilic nature include, for example, those disclosed in U.S. Pat. No. 4,698,223, which disclosure is incorporated herein by reference. The gum base is formulated with the inventive microencapsulated flavoring agent and conventional additives such as a bulking agent to prepare a wide variety of flavored chewing gum compositions.

The amount of gum base employed in the chewing gum composition will vary depending on such factors as the type of gum base used, the consistency desired, and the other components used to make the final chewing gum product. In general, the gum base having an enhanced hydrophilic character will be present in the chewing gum composition in an amount from about 50% to about 95%, preferably from about 50% to about 85%, and more preferably from about 60% to about 70%, by weight of the chewing gum composition.

In another embodiment, the invention pertains to a chewing gum composition which contains lower amounts of a chewing gum base, i.e., gum base present in an amount up to about 55%, preferably from about 15% to about 40%, and more preferably from about 20% to about 35%, by weight of the chewing gum composition. In this embodiment, the gum base will comprise an elastomer and a variety of traditional ingredients such as an elastomer solvent, waxes, emulsifying agents, plasticizers or softeners, bulking agents such as mineral adjuvants which may serve as fillers and textural agents, coloring agents, antioxidants, preservatives, flavoring agents, and the like, and mixtures thereof. Illustrative examples of these gum base components have been set out above.

Once prepared, the gum base may be formulated with the microencapsulated flavoring agent of the present invention and conventional additives such as a bulking agent to prepare a wide variety of chewing gum compositions.

In addition to the chewing gum base, the chewing gum composition will include a bulking agent. The bulking agents (carriers, extenders) in the present invention may be water-soluble and include sweetening agents selected from the group consisting of, but not limited to, monosaccharides, disaccharides, polysaccharides, sugar alcohols, and mixtures thereof; randomly bonded glucose polymers such as those polymers distributed under the tradename Polydextrose by Pfizer, Inc., Groton, Connecticut; isomalt (a racemic mixture of alpha-D-glucopyranosyl-1,6-mannitol and alpha-D-glucopyranosyl-1,6-sorbitol manufactured under the tradename Palatinit by Suddeutsche Zucker), maltodextrins; hydrogenated starch hydrolysates; hydrogenated hexoses; hydrogenated disaccharides; minerals, such as calcium carbonate, talc, titanium dioxide, dicalcium phosphate, celluloses and the and the like, and mixtures thereof. Bulking agents may be used in amounts up to about 60%, and preferably in amounts from about 25% to about 60%, by weight of the chewing gum composition.

Suitable sugar bulking agents include monosaccharides, disaccharides and polysaccharides such as xylose, ribulose, glucose (dextrose), mannose, galactose, fructose (levulose), sucrose (sugar), maltose, invert sugar, partially hydrolyzed starch and corn syrup solids, and mixtures thereof. Mixtures of sucrose and corn syrup solids are the preferred sugar bulking agents.

Suitable sugar alcohol bulking agents include sorbitol, xylitol, mannitol, galactitol, maltitol, and mixtures thereof. Mixtures of sorbitol and mannitol are the preferred sugar alcohol bulking agents.

Maltitol is a sweet, non-caloric, water-soluble sugar alcohol useful as a bulking agent in the preparation of non-caloric beverages and foodstuffs and is more fully described in U.S. Pat. No. 3,708,396, which disclosure is incorporated herein by reference. Maltitol is made by hydrogenation of maltose which is the most common reducing disaccharide and is found in starch and other natural products.

The gum composition may include effective amounts of conventional additives selected from the group consisting of plasticizers, softeners, emulsifying agents, waxes, fillers, mineral adjuvants, flavoring agents (flavors, flavorings), coloring agents (colorants, colorings), antioxidants, acidulants, thickening agents, and the like, and mixtures thereof. These ingredients are present in the chewing gum composition in an amount to bring the total amount of chewing gum composition to 100%. Some of these additives may serve more than one purpose. For example, in sugarless gum compositions, a sweetener, such as sorbitol or other sugar alcohol, may also function as a bulking agent.

The plasticizers, softening agents, mineral adjuvants, waxes and antioxidants discussed above, as being suitable for use in the gum base, may also be used in the chewing gum composition. Examples of other conventional additives which may be used include emulsifying agents, such as lecithin and glyceryl monostearate, thickening agents, used alone or in combination with other softeners, such as methyl cellulose, alginates, carrageenan, xanthan gum, gelatin, carob, tragacanth, and locust bean, acidulants such as malic acid, adipic acid, citric acid, tartaric acid, fumaric acid, and mixtures thereof, and fillers, such as those discussed above under the category of mineral adjuvants.

Additional flavoring agents may also be used. The flavoring agent may be employed in either liquid form and/or dried form. When employed in the latter form, suitable drying means such as spray drying the oil may be used. Alternatively, the flavoring agent may be absorbed onto water soluble materials, such as cellulose, starch, sugar, maltodextrin, gum arabic and so forth or may be encapsulated. The actual techniques for preparing such dried forms are well known and do not constitute a part of this invention.

The flavoring agents of the present invention may be used in many distinct physical forms well known in the art to provide an initial burst of flavor and/or a prolonged sensation of flavor. Without being limited thereto, such physical forms include free forms, such as spray dried, powdered, and beaded forms, and encapsulated forms, and mixtures thereof.

Encapsulated delivery systems for flavoring agents or sweetening agents comprise a hydrophobic matrix of fat or wax surrounding a sweetening agent or flavoring agent core. The fats may be selected from any number of conventional materials such as fatty acids, glycerides or polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil, and mixtures thereof. Glycerides which are useful include monoglycerides, diglycerides, and triglycerides.

Waxes useful may be chosen from the group consisting of natural and synthetic waxes, and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes may be use individually or in combination in amounts varying from about 10 to about 70%, and preferably in amounts from about 40 to about 58%, by weight of the encapsulated system. When used in combination, the fat and wax are preferably present in a ratio from about 70:10 to 85:15, respectively.

Typical encapsulated flavoring agent or sweetening agent delivery systems are disclosed in U.S. Pat. Nos. 4,597,970 and 4,722,845, which disclosures are incorporated herein by reference.

The amount of flavoring agent employed herein is normally a matter of preference subject to such factors as the type of final chewing gum composition, the individual flavor, the gum base employed, and the strength of flavor desired. Thus, the amount of flavoring may be varied in order to obtain the result desired in the final product and such variations are within the capabilities of those skilled in the art without the need for undue experimentation. In gum compositions, the flavoring agent is generally present in amounts from about 0.02% to about 5%, and preferably from about 0.1% to about 2%, and more preferably, from about 0.8% to about 1.8%, by weight of the chewing gum composition.

The coloring agents useful in the present invention are used in amounts effective to produce the desired color. These coloring agents include pigments which may be incorporated in amounts up to about 6%, by weight of the gum composition. A preferred pigment, titanium dioxide, may be incorporated in amounts up to about 2%, and preferably less than about 1%, by weight of the gum composition. The colorants may also include natural food colors and dyes suitable for food, drug and cosmetic applications. These colorants are known as F.D.& C. dyes and lakes. The materials acceptable for the foregoing uses are preferably water-soluble. Illustrative nonlimiting examples include the indigoid dye known as F.D.& C. Blue No.2, which is the disodium salt of 5,5-indigotindisulfonic acid. Similarly, the dye known as F.D.& C. Green No.1 comprises a triphenylmethane dye and is the monosodium salt of 4-[4-(N-ethyl-p-sulfonimbenzylamino) diphenylmethylene]-[1-(N-ethyl-N-p-sulfoniumbenzyl)-delta-2,5-cyclohexadieneimine]. A full recitation of all F.D.& C. colorants and their corresponding chemical structures may be found in the Kirk-Othmer Encyclopedia of Chemical Technology, 3rd Edition, in volume 5 at pages 857–884, which text is incorporated herein by reference.

Suitable oils and fats usable in gum compositions include partially hydrogenated vegetable or animal fats, such as coconut oil, palm kernel oil, beef tallow, lard, and the like. These ingredients when used are generally present in amounts up to about 7%, and preferably up to about 3.5%, by weight of the gum composition.

In accordance with this invention, effective amounts of the microencapsulated flavoring agent of the present invention may be admixed into the chewing gum composition. The exact amount of microencapsulated flavoring agent employed is normally a matter of preference subject to such factors as the particular type of gum composition being prepared, the type of bulking agent or carrier employed, the type of flavor employed and the intensity of flavor desired. Thus, the amount of microencapsulated flavoring agent may be varied in order to obtain the result desired in the final product and such variations are within the capabilities of those skilled in the art without the need for undue experimentation. In general, the amount of microencapsulated flavoring agent normally present in a chewing gum composition will be from about 0.02% to about 5%, preferably from about 0.1% to about 3%, and more preferably from about 0.8% to about 2%, by weight of the chewing gum composition.

In a preferred embodiment, the present invention is directed at a flavored chewing gum composition which comprises:
 (i) a chewing gum base;
 (ii) a bulking agent; and
 (iii) a microencapsulated flavoring agent in the form of a spheroidal microcapsule which comprises a core and a coating layer over the core, wherein the microcapsule comprises:
 (A) a core present in an amount up to about 90%, by weight of the microcapsule, which comprises:
  (a) a flavoring agent in an amount from about 20% to about 80%, by weight of the core; and
  (b) a resin in an amount from about 80% to about 20%, by weight of the core; and
 (B) a coating layer over the core which comprises in percentages by weight of the coating layer;
  (a) gelatin in an amount from about 45% to about 49%;
  (b) gum arabic in an amount from about 45% to about 49%; and
  (c) glutaraldehyde in an amount from about 2% to about 10%.

The present invention also includes a method for preparing the improved chewing gum compositions, including both chewing gum and bubble gum formulations. The chewing gum compositions may be prepared using standard techniques and equipment known to those skilled in the art. The apparatus useful in accordance with the present invention comprises mixing and heating apparatus well known in the chewing gum manufacturing arts, and therefore the selection of the specific apparatus will be apparent to the artisan.

In such a method, a chewing gum composition is made by admixing the gum base with the microencapsulated flavoring agent and the other ingredients of the final desired chewing gum composition. Other ingredients will usually be incorporated into the composition as dictated by the nature of the desired composition as well known by those having ordinary skill in the art. The ultimate chewing gum compositions are readily prepared using methods generally known in the food technology and chewing gum arts.

For example, the gum base is heated to a temperature sufficiently high to soften the base without adversely effecting the physical and chemical make up of the base. The optimal temperatures utilized may vary depending upon the composition of the gum base used, but such temperatures are readily determined by those skilled in the art without undue experimentation.

The gum base is conventionally melted at temperatures that range from about 60° C. to about 120° C. for a period of time sufficient to render the base molten. For example, the gum base may be heated under these conditions for a period of about thirty minutes just prior to being admixed incrementally with the remaining ingredients of the gum composition such as the inventive flavoring composition, plasticizer, the softener, the bulking agent, and/or fillers, coloring agents and flavoring agents to plasticize the blend as well as to modulate the hardness, viscoelasticity and formability of the base. Mixing is continued until a uniform mixture of gum composition is obtained. Thereafter the gum composition mixture may be formed into desirable chewing gum shapes.

Another important aspect of the present invention includes a flavored confectionery composition incorporating the inventive microencapsulated flavoring agent and a method for preparing the flavored confectionery compositions. The preparation of confectionery formulations is historically well known and has changed little through the years. Confectionery items have been classified as either "hard" confectionery or "soft" confectionery. The microencapsulated flavoring agents of the present invention can be incorporated into the confections by admixing the inventive composition into the conventional hard and soft confections.

Hard confectionery may be processed and formulated by conventional means. In general, a hard confectionery has a base composed of a mixture of sugar and other carbohydrate bulking agents kept in an amorphous or glassy condition. This form is considered a solid syrup of sugars generally having from about 0.5% to about 1.5% moisture. Such materials normally contain up to about 92% corn syrup, up to about 55% sugar and from about 0.1% to about 5% water, by weight of the final composition. The syrup component is generally prepared from corn syrups high in fructose, but may include other materials. Further ingredients such as flavorings, sweeteners, acidulants, colorants and so forth may also be added.

Such confectionery may be routinely prepared by conventional methods such as those involving fire cookers, vacuum cookers, and scraped-surface cookers also referred to as high speed atmospheric cookers.

Fire cookers involve the traditional method of making a candy base. In this method, the desired quantity of carbohydrate bulking agent is dissolved in water by heating the agent in a kettle until the bulking agent dissolves. Additional bulking agent may then be added and cooking continued until a final temperature of 145° C. to 156° C. is achieved. The batch is then cooled and worked as a plastic-like mass to incorporate additives such as flavors, colorants and the like.

A high-speed atmospheric cooker uses a heat-exchanger surface which involves spreading a film of candy on a heat exchange surface, the candy is heated to 165° C. to 170° C. in a few minutes. The candy is then rapidly cooled to 100° C. to 120° C. and worked as a plastic-like mass enabling incorporation of the additives, such as flavors, colorants and the like.

In vacuum cookers, the carbohydrate bulking agent is boiled to 125° C. to 132° C., vacuum is applied and additional water is boiled off without extra heating. When cooking is complete, the mass is a semi-solid and has a plastic-like consistency. At this point, flavors, colorants, and other additives are admixed in the mass by routine mechanical mixing operations.

The optimum mixing required to uniformly mix the flavors, colorants and other additives during conventional manufacturing of hard confectionery is determined by the time needed to obtain a uniform distribution of the materials. Normally, mixing times of from 4 to 10 minutes have been found to be acceptable.

Once the candy mass has been properly tempered, it may be cut into workable portions or formed into desired shapes. A variety of forming techniques may be utilized depending upon the shape and size of the final product desired. A general discussion of the composition and preparation of hard confections may be found in H. A. Lieberman, *Pharmaceutical Dosage Forms: Tablets*, Volume 1 (1980), Marcel Dekker, Inc., New York, N.Y. at pages 339 to 469, which disclosure is incorporated herein by reference.

The apparatus useful in accordance with the present invention comprises cooking and mixing apparatus well known in the confectionery manufacturing arts, and therefore the selection of the specific apparatus will be apparent to the artisan.

In contrast, compressed tablet confections contain particular materials and are formed into structures under pressure. These confections generally contain sugars in amounts up to about 95%, by weight of the composition, and typical tablet excipients such as binders and lubricants as well as flavors, colorants and so forth.

Similar to hard confectionery, soft confectionery may be utilized in this invention. The preparation of soft confections, such as nougat, involves conventional methods, such as the combination of two primary components, namely (1) a high boiling syrup such as a corn syrup, hydrogenated starch hydrolysate or the like, and (2) a relatively light textured frappe, generally prepared from egg albumin, gelatin, vegetable proteins, such as soy derived compounds, sugarless milk derived compounds such as milk proteins, and mixtures thereof. The frappe is generally relatively light, and may, for example, range in density from about 0.5 to about 0.7 grams/cc.

The high boiling syrup, or "bob syrup" of the soft confectionery is relatively viscous and has a higher density than the frappe component, and frequently contains a substantial amount of carbohydrate bulking agent such as a hydrogenated starch hydrolysate. Conventionally, the final nougat composition is prepared by the addition of the "bob syrup" to the frappe under agitation, to form the basic nougat mixture. Further ingredients such as flavoring, additional carbohydrate bulking agent, colorants, preservatives, medicaments, mixtures thereof and the like may be added thereafter also under agitation. A general discussion of the composition and preparation of nougat confections may be found in B. W. Minifie, *Chocolate, Cocoa and Confectionery: Science and Technology*, 2nd edition, AVI Publishing Co., Inc., Westport, Conn. (1980), at pages 424–425, which disclosure is incorporated herein by reference.

The procedure for preparing the soft confectionery involves known procedures. In general, the frappe component is prepared first and thereafter the syrup component is slowly added under agitation at a temperature of at least about 65° C., and preferably at least about 100° C. The mixture of components is continued to be mixed to form a uniform mixture, after which the mixture is cooled to a temperature below 80° C., at which point, the flavor may be added. The mixture is further mixed for an additional period until it is ready to be removed and formed into suitable confectionery shapes.

In accordance with this invention, effective amounts of the microencapsulated flavoring agents of the present invention may be admixed into the hard and soft confections. The exact amount of microencapsulated flavoring agent may be varied in order to obtain the result desired in the final product and such variations are within the capabilities of those skilled in the art without the need for undue experimentation. The exact amount of microencapsulated flavoring agent employed is normally a matter of preference subject to such factors as the particular type of confection being prepared, the type of bulking agent or carrier employed, the type of flavor employed and the intensity of flavor desired. Thus, the amount of microencapsulated flavoring agent may be varied in order to obtain the result desired in the final product and such variations are within the capabilities of those skilled in the art without the need for undue experimentation. In general, the amount of microencapsulated flavoring agent normally present in a hard or soft confection will be from about 0.05% to about 1%, preferably from about 0.1% to about 0.4%, from about 0.15% to about 0.35%, by weight of the confection.

The present invention extends to methods of making the improved flavored confections. The microencapsulated flavoring agents may be incorporated into an otherwise conventional hard or soft confection composition using standard techniques and equipment known to those skilled in the art. The apparatus useful in accordance with the present invention comprises mixing and heating apparatus well known in the confectionery manufacturing arts, and therefore the selection of the specific apparatus will be apparent to the artisan.

In such a method, a composition is made by admixing the inventive microencapsulated flavoring agent and the confectionery bulking agent into the confectionery composition along with the other ingredients of the final desired composition. Other ingredients will usually be incorporated into the composition as dictated by the nature of the desired composition as well known by those having ordinary skill in the art. The ultimate confectionery compositions are readily prepared using methods generally known in the food technology and pharmaceutical arts. Thereafter the confectionery mixture may be formed into desirable confectionery shapes.

The microencapsulated flavoring agents may be formulated with conventional ingredients which offer a variety of textures to suit particular applications. Such ingredients may be in the form of hard and soft confections, tablets, toffee, nougat, chewy candy, chewing gum and so forth, both sugar and sugarless. The acceptable ingredients may be selected from a wide range of materials. Without being limited thereto, such materials include diluents, binders and adhesives, lubricants, disintegrants, bulking agents, humectants and buffers and adsorbents. The preparation of such confections and chewing gum products is well known.

In a preferred embodiment, the invention is directed at a flavored confectionery composition which comprises:

(i) a confectionery base;
(ii) a microencapsulated flavoring agent in the form of a spheroidal microcapsule which comprises a core and a coating layer over the core, wherein the microcapsule comprises:

(A) a core present in an amount up to about 90%, by weight of the microcapsule, which comprises:
(a) a flavoring agent in an amount from about 20% to about 80%, by weight of the core; and
(b) a resin in an amount from about 80% to about 20%, by weight of the core; and (B) a coating layer over the core which comprises in percentages by weight of the coating layer;
(a) gelatin in an amount from about 45% to about 49%;
(b) gum arabic in an amount from about 45% to about 49%; and
(c) glutaraldehyde in an amount from about 2% to about 10%.

In another preferred embodiment, the invention is directed at a method for preparing a flavored confectionery composition which comprises admixing an effective amount of the microencapsulated flavoring agent with a confectionery bulking agent. In yet another embodiment, the present invention is directed at a method for flavoring a confectionery composition which comprises admixing an effective amount of a microencapsulated flavoring agent with the confectionery composition.

The present invention is further illustrated by the following examples which are not intended to limit the effective scope of the claims. All parts and percentages in the examples and throughout the specification and claims are by weight of the final composition unless otherwise specified.

EXAMPLE

This example demonstrates the preparation of microencapsulated flavoring agents which contain a core comprising 40% flavor oil and 40% resin, by weight of the microcapsule.

Microencapsulated flavoring agents were prepared using the components set out in Table 1.

TABLE 1

MICROENCAPSULATED FLAVORING AGENT COMPONENTS

| Ingredients | Amount | Weight Percentage Of Coating Layer |
|---|---|---|
| Gelatin | 26.4 g | 47.7% |
| Water (11% aqueous solution) | 213.6 g | |
| Gum Arabic | 26.4 g | 47.7% |
| Water (11% aqueous solution) | 213.6 g | |
| Glutaraldehyde (10 ml, 25% aqueous solution) | 2.5 | 4.5% |
| Flavor Oil | 130 g | |
| Resin | 130 g | |

The gelatin was added to the water at 50° C. under agitation until a clear solution was formed. Similarly, the gum arabic was added to the water at 50° C. under agitation until a clear solution was formed. The resin (the glycerol ester of partially hydrogenated wood rosin) was melted and the flavoring agent (peppermint oil) was admixed to the resin melt to form a homogeneous mixture which was then cooled to room temperature.

The flavoring agent and resin mixture (260 g total) was admixed with the gum arabic solution (11%) at a temperature of 45° C. to 50° C. and a mixing speed of 170 rpm-180 rpm to form an emulsion. The pH of the emulsion was 4.6 and the viscosity was 80 cps. The mixing speed of the emulsion was raised to 350 rpm. The gelatin solution (11%) was then admixed with the emulsion at a temperature of about 48° C. and a mixing speed of 350 rpm (pH 4.7). The emulsion was then diluted with water (1500 ml, 48° C., pH 4.8 and mixing speed 350 rpm) and the pH of the emulsion was adjusted to a value of 4.2 with acetic acid (48° C. and mixing speed 350 rpm). The emulsion was then cooled to room temperature and stirred overnight (mixing speed 150 rpm, viscosity 30 cps). The emulsion was then cooled to 6° C. at a mixing speed of 350 rpm and glutaraldehyde solution (10 g, 25% aqueous solution) was admixed with the emulsion. The emulsion was warmed to room temperature and stirred overnight at a mixing speed of 150 rpm-180 rpm. The emulsion was then poured into 2 liters of water and 3g of Syloid 244P/Cabosil M-5 (anticaking agent) was added with stirring to the mixture. The microcapsules at the bottom of the vessel were washed four (4) times with water, then filtered and air dried to yield 240 g of microencapsulated flavoring agent (yield 75%).

The microcapsules prepared above were judged to have good delayed sustained release properties.

The invention being thus described, it will be obvious that the same may be varied in many ways. Such variations are not to be regarded as a departure from the spirit and scope of the invention and all such modifications are intended to be included within the scope of the following claims.

We claim:

1. A microencapsulated flavoring agent in the form of a spheroidal microcapsule which comprises a core and a coating layer over the core, wherein the microcapsule consists essentially of:
   (A) a core present in an amount up to about 90%, by weight of the microcapsule, which consists essentially of:
      (a) a flavoring agent in an amount from about 20% to about 80%, by weight of the core; and
      (b) a resin in an amount from about 80% to about 20%, by weight of the core; and
   (B) a coating layer over the core which consists essentially of in percentages by weight of the coating layer;
      (a) gelatin in an amount from about 45% to about 49%;
      (b) gum arabic in an amount from about 45% to about 49%; and
      (c) glutaraldehyde in an amount from about 2% to about 10%, wherein the resin in the core stabilizes the flavoring agent as well as delaying the release of said flavoring agent.

2. The microencapsulated flavoring agent according to claim 1, wherein the core is present in an amount up to about 85%, by weight of the microcapsule.

3. The microencapsulated flavoring agent according to claim 1, wherein the flavoring agent the core in an amount from about 35% to about 65% and a resin in an amount from about 65% to about 35%, by weight of the core.

4. The microencapsulated flavoring agent according to claim 1, wherein the flavoring agent is selected from the group consisting of peppermint oil, cinnamon oil, spearmint oil, fruit flavor oil, and mixtures thereof.

5. The microencapsulated flavoring agent according to claim 1, wherein the resin is selected from the group consisting of the pentaerythritol ester of partially hydrogenated wood rosin, the pentaerythritol ester of wood rosin, the glycerol ester of wood rosin, the glycerol ester of partially dimerized rosin, the glycerol ester of polymerized rosin, the glycerol ester of tall oil rosin, the glycerol ester of wood rosin and partially hydrogenated wood and gum rosin and the partially hydrogenated methyl ester of rosin, such as polymers of alpha-pinene, beta-pinene, terpene resins, polyterpene, and mixtures thereof.

6. An edible composition comprising a pharmaceutically acceptable carrier and an effective amount of a microencapsulated flavoring agent to flavor the composition in the form of a spheroidal microcapsule which comprises a core and a coating layer over the core, wherein the microcapsule consists essentially of:
   (A) a core present in an amount up to about 90% by weight of the microcapsule, which consists essentially of:
      (a) a flavoring agent in an amount from about 20% to about 80%, by weight of the core; and
      (b) a resin in an amount from about 80% to about 20%, by weight of the core; and
   (B) a coating layer over the core which consists essentially of in percentages by weight of the coating layer;
      (a) gelatin in an amount from about 45% to about 49%;
      (b) gum arabic in an amount from about 45% to about 49%; and
      (c) glutaraldehyde in an amount from about 2% to about 10%, wherein the resin in the core stabilizes the flavoring agent as well as delaying the release of said flavoring agent.

7. The edible composition according to claim 6, wherein the microencapsulated flavoring agent is present in an amount from about 0.02% to about 5%, by weight of the edible composition.

8. The edible composition according to claim 6, wherein the core is present in an amount up to about 85%, by weight of the microcapsule.

9. The edible composition according to claim 6, wherein the flavoring agent is selected from the group consisting of peppermint oil, cinnamon oil, spearmint oil, fruit flavor oil, and mixtures thereof.

10. The edible composition according to claim 6, wherein the resin is selected from the group consisting of the pentaerythritol ester of partially hydrogenated wood rosin, the pentaerythritol ester of wood rosin, the glycerol ester of wood rosin, the glycerol ester of partially dimerized rosin, the glycerol ester of polymerized rosin, the glycerol ester of tall oil rosin, the glycerol ester of wood rosin and partially hydrogenated wood and gum rosin and the partially hydrogenated methyl ester of rosin, such as polymers of alpha-pinene, beta-pinene, terpene resins, polyterpene, and mixtures thereof.

11. A flavored chewing gum composition which comprises:
   (i) a chewing gum base;
   (ii) a bulking agent; and
   (iii) an effective amount of a microencapsulated flavoring agent to flavor the composition in the form of a spheroidal microcapsule which comprises a core and a coating layer over the core, wherein the microcapsule consists essentially of:
      (A) a core present in an amount up to about 90%, by weight of the microcapsule, which consists essentially of:
         (a) a flavoring agent in an amount from about 20% to about 80%, by weight of the core; and
         (b) a resin in an amount from about 80% to about 20%, by weight of the core; and
      (B) a coating layer over the core which consists essentially of in percentages by weight of the coating layer;
         (a) gelatin in an amount from about 45% to about 49%;
         (b) gum arabic in an amount from about 45% to about 49%; and
         (c) glutaraldehyde in an amount from about 2% to about 10%, wherein the resin in the core stabilizes the flavoring agent as well as delaying the release of said flavoring agent.

12. The chewing gum composition according to claim 11, wherein the microencapsulated flavoring agent is present in an amount from about 0.02% to about 5%, by weight of the chewing gum composition.

13. The chewing gum composition according to claim 11, wherein the gum base is present in an amount up to about 55%, by weight of the chewing gum composition.

14. The chewing gum composition according to claim 11, wherein the gum base is present in an amount from about 50% to about 85%, by weight of the chewing gum composition.

15. The chewing gum composition according to claim 11, wherein the core is present in an amount up to about 85%, by weight of the microcapsule.

16. The chewing gum composition according to claim 11, wherein the flavoring agent is selected from the group consisting of peppermint oil, cinnamon oil, spearmint oil, fruit flavor oil, and mixtures thereof.

17. The chewing gum composition according to claim 11, wherein the resin is selected from the group consisting of the pentaerythritol ester of partially hydrogenated wood rosin, the pentaerythritol ester of wood rosin, the glycerol ester of wood rosin, the glycerol ester of partially dimerized rosin, the glycerol ester of polymerized rosin, the glycerol ester of tall oil rosin, the glycerol ester of wood rosin and partially hydrogenated wood and gum rosin and the partially hydrogenated methyl ester of rosin, such as polymers of alpha-pinene, beta-pinene, terpene resins, polyterpene, and mixtures thereof.

18. A flavored confectionery composition which comprises:
   (i) a confectionery base; and
   (ii) an effective amount of a microencapsulated flavoring agent to flavor the composition in the form of a spheroidal microcapsule which comprises a core and a coating layer over the core, wherein the microcapsule consists essentially of:
   (A) a core present in an amount up to about 90%, by weight of the microcapsule, which consists essentially of:
      (a) a flavoring agent in an amount from about 20% to about 80%, by weight of the core; and
      (b) a resin in an amount from about 80% to about 20%, by weight of the core; and
   (B) a coating layer over the core which consists essentially of in percentages by weight of the coating layer;
      (a) gelatin in an amount from about 45% to about 49%;
      (b) gum arabic in an amount from about 45% to about 49%; and
      (c) glutaraldehyde in an amount from about 2% to about 10%, wherein the resin in the core stabilizes the flavoring agent as well as delaying the release of said flavoring agent.

19. The confectionery composition according to claim 18, wherein the microencapsulated flavoring agent is present in an amount from about 0.02% to about 5%, by weight of the confectionery composition.

20. A method for preparing a microencapsulated flavoring agent in the form of a spheroidal microcapsule which consists essentially of a core and a coating layer over the core, which comprises the steps of:
   (1) providing the following ingredients:
   (A) a core present in an amount up to about 90%, by weight of the microcapsule, which consists essentially of
      (a) a flavoring agent in an amount from about 20% to about 80%, by weight of the core; and
      (b) a resin in an amount from about 80% to about 20%, by weight of the core; and
   (B) a coating layer over the core which consists essentially of percentages by weight of the coating layer;
      (a) gelatin in an amount from about 45% to about 49%;
      (b) gum arabic in an amount from about 45% to about 49%; and
      (c) glutaraldehyde in an amount from about 2% to about 10%;
   (2) forming an aqueous solution of the gelatin at a temperature above the gelation temperature of the gelatin;
   (3) melting the resin and admixing the flavoring agent to the melted resin;
   (4) cooling the mixture of flavoring agent and resin and admixing the mixture to the aqueous gelatin to form an emulsion;
   (5) forming an aqueous solution of the gum arabic at a temperature above the gelation temperature of the gum arabic;
   (6) admixing the aqueous solution of gum arabic to the emulsion of step (4);
   (7) diluting the emulsion with water and adjusting the pH of the emulsion to cause coacervation of microcapsules;
   (8) lowering the temperature of the emulsion to below the gelation temperature of the gelatin and gum arabic to cause gelation of the microcapsules;
   (9) treating the microcapsules with an aqueous solution of glutaraldehyde; and
   (10) recovering the microcapsules, wherein the resin in the core stabilizes the flavoring agent as well as delaying the release of said flavoring agent.

21. A method for preparing a flavored edible composition which comprises admixing an effective amount of a microencapsulated flavoring agent to flavor the composition with a pharmaceutically acceptable carrier, wherein the microencapsulated flavoring agent is in the form of a spheroidal microcapsule which comprises a core and a coating layer over the core, wherein the microcapsule consists essentially of:
   (A) a core present in an amount up to about 90%, by weight of the microcapsule, which consists essentially of:
      (a) a flavoring agent in an amount from about 20% to about 80%, by weight of the core; and
      (b) a resin in an amount from about 80% to about 20%, by weight of the core; and
   (B) a coating layer over the core which consists essentially of in percentages by weight of the coating layer;
      (a) gelatin in an amount from about 45% to about 49%;
      (b) gum arabic in an amount from about 45% to about 49%; and
      (c) glutaraldehyde in an amount from about 2% to about 10%, wherein the resin in the core stabilizes the flavoring agent as well as delaying the release of said flavoring agent.

22. A method for preparing a flavored chewing gum composition which comprises the steps of:

(1) providing the following ingredients:
  (i) a gum base;
  (ii) a bulking agent; and
  (iii) an effective amount of a microencapsulated flavoring agent to flavor the composition in the form of a spheroidal microcapsule which comprises a core and a coating layer over the core, wherein the microcapsule consists essentially of:
(A) a core present in an amount up to about 90%, by weight of the microcapsule, which consists essentially of:
  (a) a flavoring agent in an amount from about 20% to about 80%, by weight of the core; and
  (b) a rosin in an amount from about 80% to about 20%, by weight of the core; and
(B) a coating layer over the core which consists essentially of in percentages by weight of the coating layer;
  (a) gelatin in an amount from about 45% to about 49%;
  (b) gum arabic in an amount from about 45% to about 49%; and
  (c) glutaraldehyde in an amount from about 2% to about 10%;
(2) melting the gum base;
(3) admixing the bulking agent and microencapsulated flavoring agent with the melted gum base; and
(4) forming the mixture from step (3) into suitable gum shapes, wherein the resin in the core stabilizes the flavoring agent as well as delaying the release of said flavoring agent.

23. A method for flavoring an edible composition which comprises adding to the edible composition an effective amount of a microencapsulated flavoring agent to flavor the composition in the form of a spheroidal microcapsule which comprises a core and a coating layer over the core, wherein the microcapsule consists essentially of:
(A) a core present in an amount up to about 90%, by weight of the microcapsule, which consists essentially of:
  (a) a flavoring agent in an amount from about 20% to about 80%, by weight of the core; and
  (b) a resin in an amount from about 80% to about 20%, by weight of the core; and
(B) a coating layer over the core which consists essentially of in percentages by weight of the coating layer;
  (a) gelatin in an amount from about 45% to about 49%;
  (b) gum arabic in an amount from about 45% to about 49%; and
  (c) glutaraldehyde in an amount from about 2% to about 10%, wherein the resin in the core stabilizes the flavoring agent as well as delaying the release of said flavoring agent.

* * * * *